(12) United States Patent
Bui et al.

(10) Patent No.: US 8,107,186 B2
(45) Date of Patent: Jan. 31, 2012

(54) DETERMINATION OF TIMING BASED SERVO PATTERN TYPE

(75) Inventors: Nhan Xuan Bui, Tucson, AZ (US);
Giovanni Cherubini, Rueschlikon (SZ);
Jens Jelitto, Rueschlikon (SZ);
Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/776,944

(22) Filed: May 10, 2010

(65) Prior Publication Data

US 2011/0273793 A1 Nov. 10, 2011

(51) Int. Cl.
G11B 21/02 (2006.01)
G11B 5/584 (2006.01)
G11B 5/09 (2006.01)
(52) U.S. Cl. ............... 360/75; 360/77.12; 360/48
(58) Field of Classification Search .................. None
See application file for complete search history.

(56) References Cited

U.S. PATENT DOCUMENTS

| | | | |
|---|---|---|---|
| 7,259,930 B2 * | 8/2007 | Ohtsu | 360/73.04 |
| 2003/0123179 A1 * | 7/2003 | Molstad et al. | 360/75 |
| 2006/0187569 A1 * | 8/2006 | Tateishi | 360/75 |

* cited by examiner

*Primary Examiner* — Andrew L Sniezek
(74) *Attorney, Agent, or Firm* — John H. Holcombe

(57) ABSTRACT

In a magnetic tape drive having a servo read system with at least one read head, the system configured to read servo pattern information as a magnetic tape is moved longitudinally with respect to the at least one read head, the servo pattern comprising a timing-based servo pattern comprising an even number of bursts of sloped magnetic stripes, adjacent bursts oppositely sloped, alternate bursts identically sloped, an embodiment of a method determines the time between detection from the read head of a same stripe of alternate bursts of a pattern; determines the time between detection from the read head of stripes of a burst of a pattern; and determines a ratio of the determined times. The ratio is compared to a threshold, wherein the threshold comprises a differentiation between different servo pattern types.

20 Claims, 8 Drawing Sheets

(a)

DETERMINATION OF TIMING BASED SERVO PATTERN TYPE

DOCUMENT INCORPORATED BY REFERENCE

Commonly assigned U.S. Pat. No. 5,689,384 is incorporated for its showing of timing based servo arrangements. Commonly assigned U.S. patent application Ser. No. 12/505,435, Filed Jul. 17, 2009, now U.S. Patent Application Publication 2011/0013312, dated Jan. 20, 2011, is incorporated for its showing of positioning a tape head using servo elements and data read elements

FIELD OF THE INVENTION

This invention relates to longitudinal magnetic tape media, and more particularly to timing based servo pattern detection.

BACKGROUND OF THE INVENTION

Timing based servo arrangements are employed with respect to longitudinal tape media, for example, in magnetic tape systems, to provide track following capability. Recorded servo patterns comprise dual transitions typically arranged as stripes recorded at more than one azimuthal orientation or slope across the tape media. The technology is discussed in the incorporated '384 patent. The timing between the stripes of any pair of stripes having different azimuthal orientations thus varies continuously as a read head is moved in the lateral direction across the servo track. The pattern is read by a servo read head whose width is small compared to the servo pattern width, and servo head lateral position is derived from the relative timing of pulses generated by crossing transitions of the stripe edges as the tape is moved in the longitudinal direction. A leading edge of a stripe comprises a transition of a first polarity and a trailing edge of a stripe comprises a transition of a second polarity opposite to that of the first polarity. Position sensing with this system is achieved by deriving a ratio of two servo pattern intervals, one pattern interval comprising the timing between the same edge of stripes having different azimuthal orientations, and the other pattern interval comprising the timing between the same edge of stripes having the same azimuthal orientation. Thus, the position sensing is ratio oriented and is insensitive to tape speed.

A typical way to determine which stripe is being read is to arrange the stripes into patterns of frames, each frame having two sub-frames, each with two bursts of stripes arranged in different azimuthal orientations. A pattern interval is provided within a sub-frame, another pattern interval is between sub-frames, and further intervals are between frames.

Different types of servo patterns are provided with alternate servo pattern geometries in which the azimuthal orientations or slopes are different as are the stripe width and stripe spacing. The type of servo pattern may be determined from a cartridge memory carried with a magnetic tape in the cartridge containing the magnetic tape. There may be cases in which the cartridge memory is missing or the information it contains is corrupted.

SUMMARY OF THE INVENTION

Methods, servo control systems, and magnetic tape drives are provided for determining the servo system type.

In one embodiment, in a magnetic tape drive having a servo read system comprising at least one read head, the system configured to read servo pattern information as a magnetic tape is moved longitudinally with respect to the read head(s), the servo pattern comprising a timing-based servo pattern comprising an even number of bursts of sloped magnetic stripes, adjacent bursts oppositely sloped, alternate bursts identically sloped, a method comprises:

determining the time between detection from the read head of a same stripe of alternate bursts of a pattern;

determining the time between detection from the read head of stripes of a burst of a pattern; and determining a ratio of the determined times.

A further embodiment additionally comprises comparing the ratio to a threshold, wherein the threshold comprises a differentiation between different servo pattern types.

In a still further embodiment, the detection of the times between the stripes comprises detection of time between signals representing the stripes, each subsequent to detection of a zero crossing in a polarity direction of the stripe signal.

In a further embodiment, the detection of the stripe comprises detection of a peak of the stripe signal in the polarity direction of the zero crossing.

In a still further embodiment, the determined times comprise times between the peaks having a same polarity direction.

In another embodiment, the steps of determining the times comprise respectively, determining time representing distance traversed between an edge of a stripe located in a sequence of stripes of a first burst of the pattern and a same edge of a stripe having the same location in a sequence of stripes of an alternate burst of the pattern (d), and determining time representing distance traversed between an edge of a stripe located in a sequence of stripes of a burst and a same edge of another stripe located in the sequence of stripes of the burst (s); the ratio comprises a ratio of (d) to (s).

In a further embodiment, the step of determining the (s) time comprises determining the time between the edges of adjacent stripes of the burst, measured as consecutive peaks of a same polarity.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
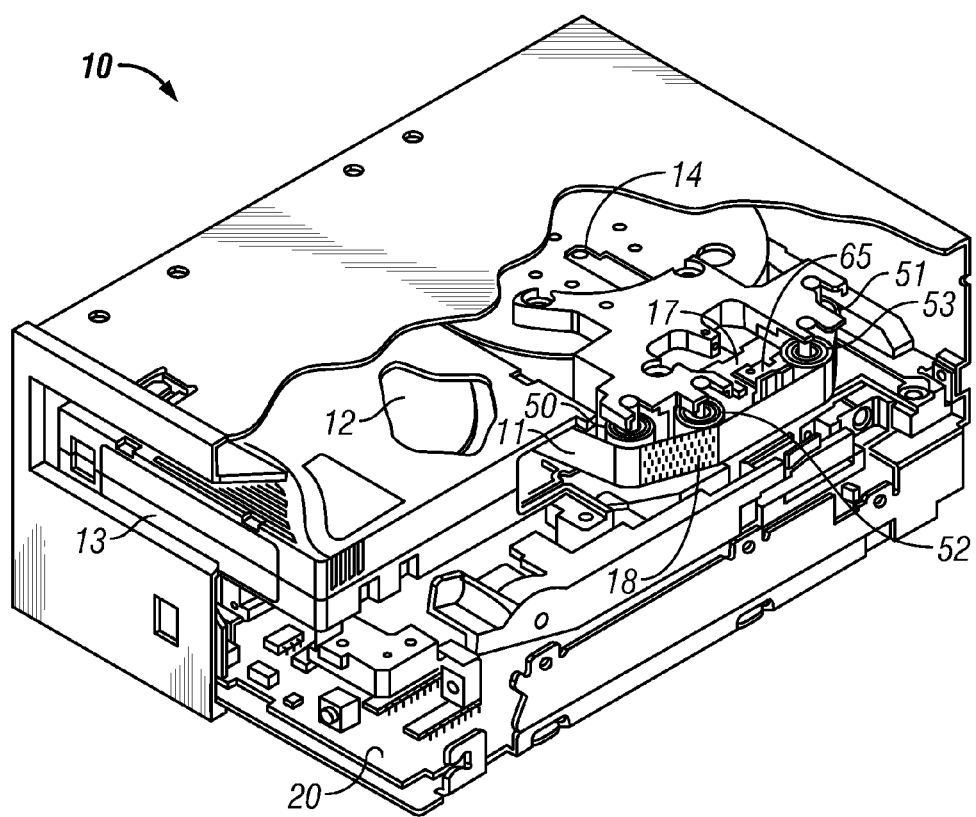
FIG. 1 is a partially cut away view of a magnetic tape data storage drive which implements the present invention.
Figure 2:
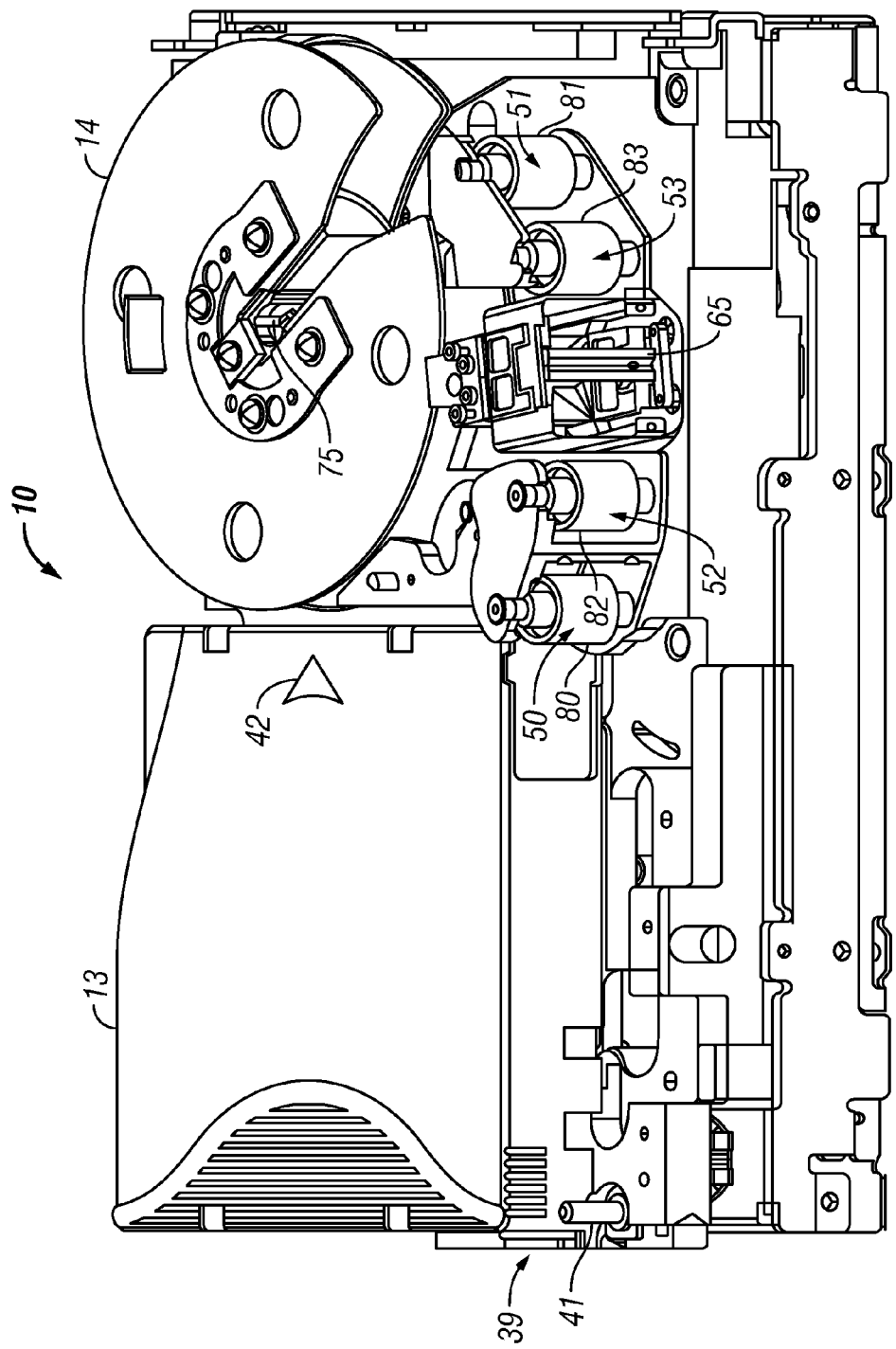
FIG. 2 is a view of the magnetic tape data storage drive of FIG. 1 with the cover removed.

FIGS. 1 and 2 illustrate a magnetic tape data storage drive 10 which writes data 18 to and reads data from longitudinal magnetic tape data storage media 11. As is understood by those of skill in the art, magnetic tape data storage drives, also called magnetic tape drives or tape drives, may take any of various forms. The illustrated magnetic tape drive 10 moves the magnetic tape 11 along a tape path in the longitudinal direction of the tape from a supply reel 12 in a magnetic tape data storage cartridge 13 to a take up reel 14. An example of a magnetic tape drive is the IBM® LTO (Linear Tape Open) magnetic tape drive. Another example of a magnetic tape drive is the IBM® TotalStorage Enterprise magnetic tape drive. Both the above examples of magnetic tape drives employ single reel tape cartridges 13. An alternative magnetic tape drive and magnetic tape cartridge is a dual reel cartridge and drive in which both reels 12 and 14 are contained in the cartridge.

The magnetic tape media 11 is moved in the longitudinal direction across a tape head 65. The tape head may be supported and laterally moved by a compound actuator 17 of a track following servo system. The magnetic tape media is supported by roller tape guides 50, 51, 52, 53 while the magnetic tape media is moved longitudinally.

A typical magnetic tape data storage drive operates in both the forward and reverse directions to read and write data. Thus, the magnetic tape head 65 may comprise one set of read and write elements for operating in the forward direction and another set for operating in the reverse direction, or alternatively, may have two sets of the read elements on either side of the write elements to allow the same write elements to write in both directions while the two sets of read elements allow a read-after-write in both directions.

The magnetic tape data storage drive 10 comprises one or more controls 20 for operating the magnetic tape data storage drive in accordance with commands received from an external system. The external system may comprise a network, a host system, a data storage library or automation system, a data storage subsystem, etc., as is known to those of skill in the art. A control typically comprises logic and/or one or more microprocessors with a memory for storing information and program information for operating the microprocessor(s) and drive. The program information may be supplied to the memory via an interface, by an input to the control 20 such as a floppy or optical disk, or by reading from a magnetic tape cartridge, or by any other suitable means. The magnetic tape data storage drive 10 may comprise a standalone unit or comprise a part of a tape library or other subsystem, which may comprise the external system. The control 20 also provides the data flow and formatter for data to be read from and written to the magnetic tape media, as is known to those of skill in the art.

A cartridge receiver 39 is configured to receive a magnetic tape cartridge 13 oriented in a single direction, and to align the magnetic tape cartridge, for example, with guide pin 41, with respect to the cartridge receiver. The proper orientation may be illustrated on the cartridge itself, for example, by arrow 42 on the cartridge. The proper orientation may be enforced by the specific shape of the cartridge or by means of various notches that interact with the receiver, as is known to those of skill in the art. The orientation of the magnetic tape cartridge is such that the magnetic tape 11 exits the cartridge at a specified point of the cartridge receiver. A tape threading mechanism may move the free end of the magnetic tape 11 from the magnetic tape cartridge 13 to a take up reel 14, for example, positioning the free end leader block at the central axis 75 of the take up reel. The magnetic tape is thus positioned along the tape path.

In the illustrated embodiment, tape guide rollers 50, 51, 52 and 53 each has a cylindrical surface 80, 81, 82, 83 oriented to provide a tape path for the magnetic tape 11 across the magnetic tape head 65.

Figure 3:
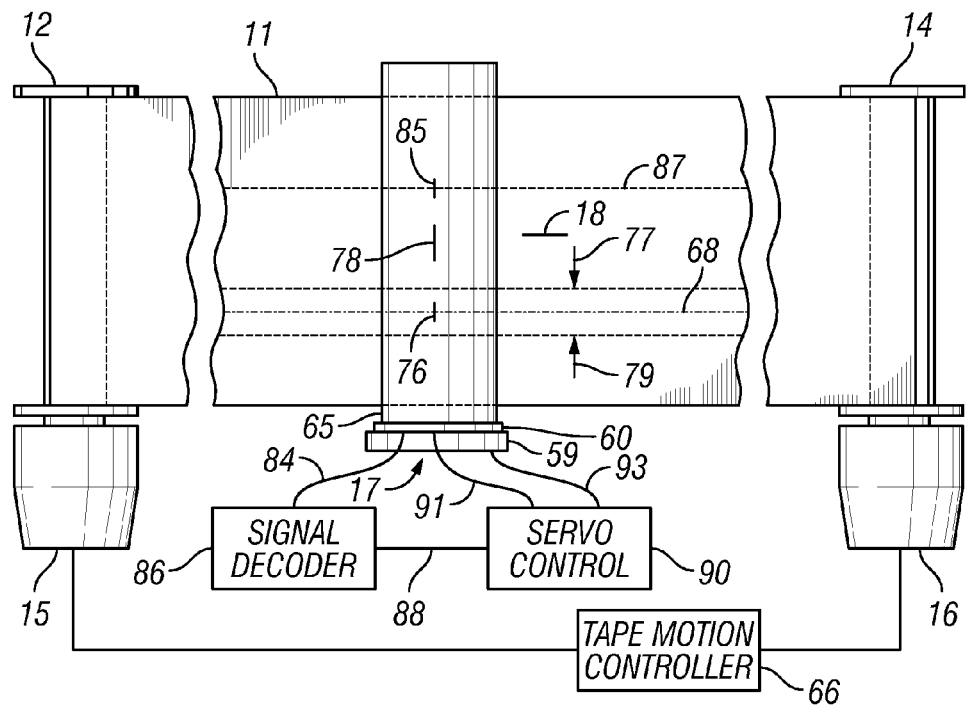
FIG. 3 is a diagrammatic view of the magnetic tape, tape head and servo system of the magnetic tape data storage drive of FIG. 1.

Referring to FIG. 3, the longitudinal tape 11 is moved across the tape head 65 between reels 12 and 14 (the tape guide rollers are not shown) by reel motors 15 and 16 under the control of a tape motion controller 66 of control 20 of FIG. 1. The reel motors are operated at various speeds as controlled by the tape motion controller to insure that the magnetic tape media leaves one reel at the same speed that it is wound onto the other reel. The tape motion controller also controls the torque applied to each drive motor 15 and 16 to control the tension applied to the magnetic tape media at the tape head 65.

The magnetic tape head 65 comprises at least one servo read head or sensor 76 that senses a servo pattern recorded in a servo band 68 of the tape 11. Alternatively, a plurality of servo read sensors, such as sensors 76 and 85 may be at various positions of the magnetic head 65, and a number of parallel servo bands, such as servo bands 68 and 87 may be at various positions across the tape 11. As is understood by those of skill in the art, the servo bands typically extend in the longitudinal direction the full length of the tape, and are prerecorded and defined as a part of the manufacturing process of the tape cartridge 13. A data head 78, which may comprise several data read/write elements, is shown positioned over a data band region 18 of the tape, for example, containing a plurality of parallel data tracks. As is understood by those of skill in the art, typically, the defined servo bands of magnetic tape systems are parallel to and offset from the data bands. The servo track 68 is illustrated as a single line, for example a centerline of a servo band that is wide enough to allow a single servo band or set of bands to allow serving of various sets of data tracks by offsetting the servo element from the centerline.

As will be discussed, the servo bands may be provided in alternative arrangements.

As the tape 11 is moved longitudinally along the tape path, the servo read head 76 reads the servo signals which are provided on a servo signal line 84 to a servo decoder 86. The servo decoder processes the received servo signals and generates a position signal that is provided on a position signal line 88 to a servo control 90. The servo control 90 responds to seek signals to cause the servo actuator 17 to move between servo bands, and responds to the position signals to cause the actuator 17 to follow the trajectory at a desired lateral position on a servo band.

Figure 4:
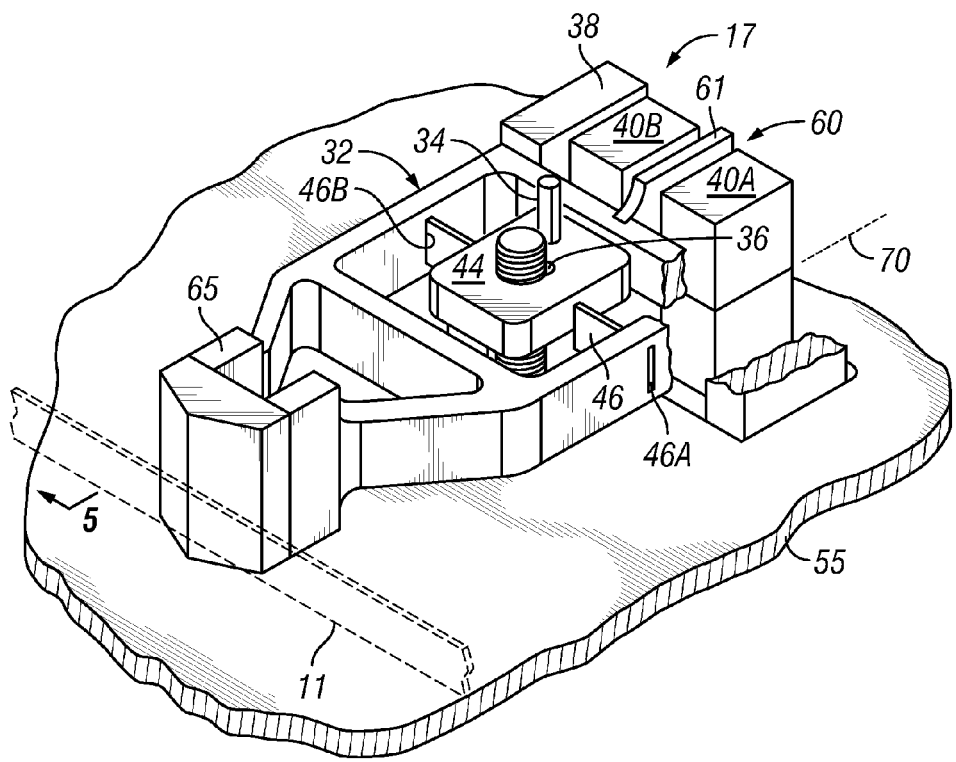
FIG. 4 is a view of a tape head and servo actuator of the magnetic tape data storage drive of FIG. 1.

Referring to FIG. 4, an embodiment of the actuator 17 is illustrated. The actuator 17 comprises a compound actuator having both coarse and fine actuators. An actuator arm 32 mounts the magnetic tape head 65. A coarse actuator lead screw 36 is arranged to move fine actuator stage 44 in a vertical direction perpendicular to a base 55 and guide 34 prevents the stage 44 from rotating. A torsion spring 46 is fixed to the stage 44 and is coupled at its ends 46A and 46B to the actuator arm 32 so that the stage 44 moves the head 65 mounted on the actuator arm 32 in a vertical direction across the tape.

A fine actuator coil assembly 60 is attached to an end of the actuator arm 32. The coil 61 is disposed between magnets 40A and 40B held in a magnet housing 38 which are arranged to split the north and south poles at approximately the line 70. The coil moves vertically and causes the actuator arm 32 to pivot about torsion spring 46 and move the tape head 65 transversely of the tape 11 to make adjustments such as in track following mode.

Referring to FIGS. 3 and 4, the servo control 90 responds to the position signals to generate servo control signals on line 91 to operate the fine actuator 60 to follow the desired trajectory on a servo band, and when the fine actuator movement is insufficient to accommodate the full move, or a large move is required for other purposes, the servo control 90 generates servo control signals on line 93 to cause the coarse actuator 36 to move the fine actuator in the desired direction.

Alternative actuators, either compound or single, are known to those of skill in the art. The operation of the servo system employing a timing based servo band is discussed in detail in the incorporated '384 patent. Acquisition of the servo band employing either servo sensors or data heads is discussed in the incorporated '435 application. Once acquired, the servo signals are sensed by servo sensor 76 of head 65, and the lateral position of the servo sensor relative to a servo band centerline is detected from the servo signals by the signal decoder 86. The detected position signals are provided on line 88 and are then compared to a reference signal to determine position error from a desired position related to the defined servo bands, called the position error signal, or "PES", and the servo control 90 operates the actuator 17 to position the head accordingly.

Figure 5:
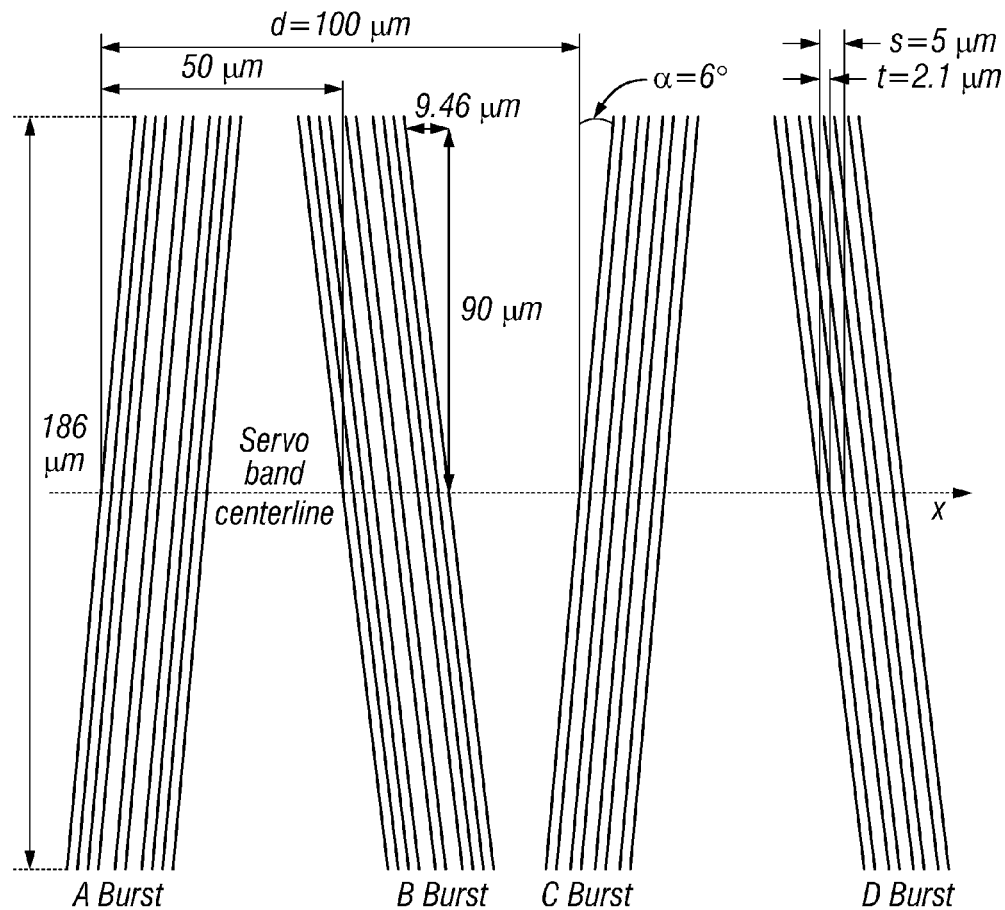
FIG. 5 is a diagrammatic view of a first servo pattern.
Figure 6:
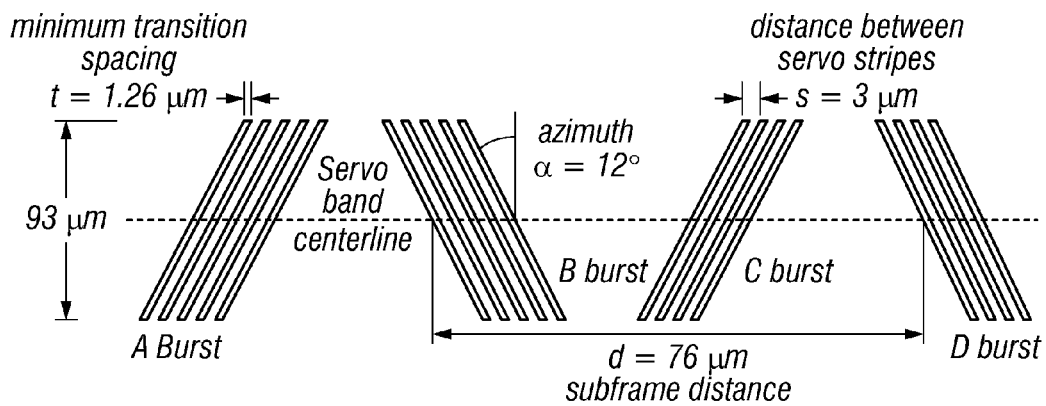
FIG. 6 is a diagrammatic view of a second servo pattern.

As discussed in the incorporated '384 patent, timing based servo arrangements are employed with respect to longitudinal tape media, for example, in magnetic tape systems, to provide track following capability. Referring to FIGS. 5 and 6, recorded servo patterns comprise dual transitions typically arranged as stripes recorded at more than one azimuthal orientation or slope across the tape media. The timing between the stripes of any pair of stripes having different azimuthal orientations thus varies continuously as a read head is moved in the lateral direction across the servo band. The pattern is read by a servo read head whose width is small compared to the servo band pattern, and servo head position is derived from the relative timing of pulses generated by crossing transitions of the stripe edges as the tape is moved in the longitudinal direction. A leading edge of a stripe comprises a transition of a first polarity and a trailing edge of a stripe comprises a transition of a second polarity opposite to that of the first polarity. Position sensing with this system is achieved by deriving a ratio of two servo pattern intervals, one pattern interval comprising the timing between the same edge of stripes having different azimuthal orientations in adjacent bursts, e.g. A and B bursts, and the other pattern interval comprising the timing between the same edge of stripes having the same azimuthal orientation in alternate bursts, e.g. A and C bursts. Thus, the position sensing is ratio oriented and is insensitive to tape speed.

The stripes are arranged into patterns of frames, each frame having two sub-frames, each with two bursts of stripes arranged in different azimuthal orientations. A pattern interval is provided within a sub-frame, another pattern interval is between sub-frames, and further intervals are between frames. The arrangement allows determination of which stripe is being read.

Different types of servo patterns are provided with alternate servo pattern geometries in which the azimuthal orientations or slopes are different as are the stripe width and stripe spacing. In a first type of servo pattern of FIG. 5, the azimuthal angles α are +/−6 degrees, the servo stripe width t (the minimum distance between magnetic transitions or edges) is 2.1 μm, the nominal distance between servo stripes s is 5 μm, and the subframe distance d is 100 μm. In a second type of servo pattern of FIG. 6, the azimuthal angles α are +/−12 degrees, the servo stripe width t (the minimum distance between magnetic transitions or edges) is 1.26 μm, the nominal distance between servo stripes s is 3 μm, and the subframe distance d is 76 μm.

The type of servo pattern may be determined from a cartridge memory carried with a magnetic tape in the cartridge containing the magnetic tape. However, there may be cases in which the cartridge memory is missing or the information it contains is corrupted.

The present invention reads servo pattern information as a magnetic tape is moved longitudinally with respect to the at least one read head, and determines the type of servo pattern. Both the types of servo patterns retain the basic sequence of the servo pattern comprising a timing-based servo pattern comprising an even number of bursts of sloped magnetic stripes, with adjacent bursts oppositely sloped, alternate bursts identically sloped. In the example, both contain the sequence of [4 4 5 5] servo stripes in a complete servo frame, the bursts called A, B, C and D.

Figure 7:
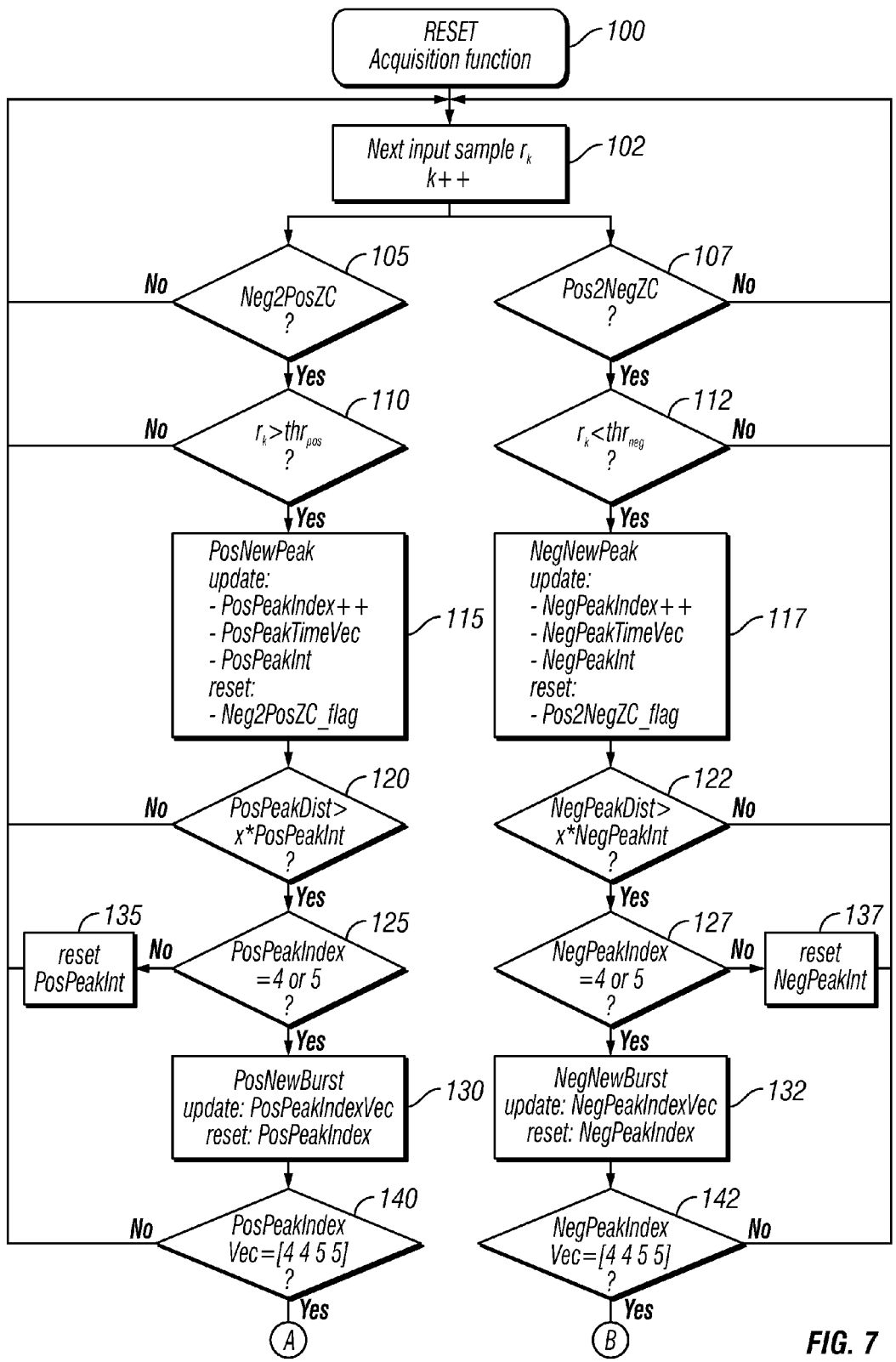
FIG. 7 is a flow chart depicting an exemplary method of operating the system of FIGS. 1, 2 and 3.
Figure 7:
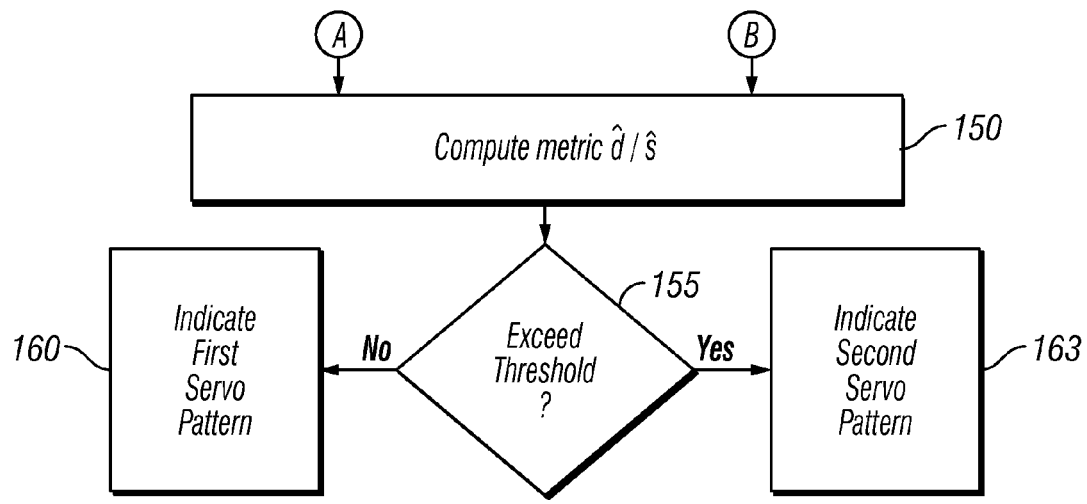

Referring to FIGS. 5, 6 and 7, the present invention determines the time between detection from the read head of a same stripe of alternate bursts of a pattern; determines the time between detection from the read head of stripes of a burst of a pattern; and determines a ratio of the determined times. The ratio is compared to a threshold, wherein the threshold comprises a differentiation between the different servo pattern types. The detection of the stripes may be by any suitable means, one embodiment comprising determining the time representing distance traversed between an edge of a stripe located in a sequence of stripes of a first burst of the pattern and a same edge of a stripe having the same location in a sequence of stripes of an alternate burst of the pattern (d), and determining time representing distance traversed between an edge of a stripe located in a sequence of stripes of a burst and a same edge of another stripe located in the sequence of stripes of the burst (s). The ratio comprises a ratio of (d) to (s).

As is known by those of skill in the art, an edge may comprise a leading or trailing edge, and, since the tape is moved bidirectionally, the leading or trailing edge is defined in one way when the tape is moved in the forward direction and oppositely when the tape is moved in the reverse direction.

The initial acquisition of servo channel parameters is initiated in step 100. Input samples ($r_k$) of the servo signals are received in step 102, for example, comprising digital representations of the signal amplitude detected by a servo head and decoded by a signal decoder as discussed above.

In one embodiment, the edge of a stripe is determined by first detecting a zero crossing, either a zero crossing from negative to positive in step 105, or a zero crossing from positive to negative in step 107. In order to maintain stripe edge to stripe edge measurements of the same edge, the zero crossings utilized must be in the same direction for all measurements. The positive peaks branch begins at step 105, and the negative peaks branch is similar, beginning at step 107. If no zero crossing is detected in step 105, the process returns to step 102 to detect the next input sample ($r_k$). A positive zero crossing of step 105, for example, is defined as when a new input sample ($r_k$) is positive and the previous sample ($r_{k-1}$) was negative. Step 105 raises a negative to positive zero crossing (Neg2PosZC) flag if a positive zero crossing is detected, and the search for a positive peak is initiated. If no positive peak is detected with respect to the input sample, step 110 returns to step 102 to detect the next input sample ($r_k$). In step 110, if an input sample ($r_k$) crosses a positive threshold, a positive peak is indicated.

The positive peak detection of step 110 results in several actions taken in step 115. A positive peak index is incremented by one and is employed to determine the stripe sequence and identify a valid [4 4 5 5] or [5 5 4 4] sequence. A positive peak time vector (PosPeakTimeVec) collects the arrival times of the positive peaks and is updated with the current peak arrival time, and is employed to detect the various metrics, including (d) and (s) discussed above. The estimated distance between two consecutive peaks (PosPeakInt) is updated if the distance between the current and the previous peak is smaller than the prior value. This distance may comprise (s). The zero crossing flag, (Neg2PosZC) flag, is reset to initiate a new search for a zero crossing.

In step 120, the distance between the current and previous peak (PosPeakDist) is detected from the positive peak time vector and is compared with the estimated peak distance within a burst. If this distance is by a factor of x (for example, x=1.5) larger than the peak distance within a servo burst, the start of a new servo burst has been detected (PosNewBurst). If a new burst is not detected in step 120, the detected peak is from an interior stripe and cannot begin the burst sequence, so the process returns to detect the next input sample ($r_k$). If a new burst is detected in step 120, the succeeding peaks will also be detected in succeeding steps 120 and employed to discern whether the positive peak index is detecting a 4 or 5 stripe burst in step 125.

In step 125, if the number of counted peaks in the current servo burst (PosPeakIndex) is a valid number (4 or 5), comprising a valid servo pattern, step 130 updates the time vector information with the peak arrival time, towards determining the (s) and (d) times. In step 130, the vector containing the number of peaks per servo burst (PosPeakIndexVec) is updated and the peak counter (PosPeakIndex) of step 115 is reset to zero. If, after a burst has been detected and a new burst is detected, and the number of counted peaks in the previous burst is not a valid number, step 135 resets the estimated distance between two consecutive peaks (PosPeakInt) to allow for a new acquisition attempt.

If step 140 indicates that a complete pattern of [4 4 5 5] or [5 5 4 4] bursts has not been completed, the process returns to obtain the next input sample ($r_k$) in step 102.

If step 140 indicates that a complete pattern has been detected (PosPeakIndexVec), estimates of (d) and (s) are computed from the peak arrival times stored in the vector PosPeakTimeVec, for example as multiples of a clock interval in step 150, and a metric ratio (d)/(s) is determined. The metric ratio (d)/(s) is independent of both the tape velocity and the lateral position.

The metric (s) comprises the time representing the distance traversed between an edge of a stripe located in a sequence of stripes of a burst and a same edge of another stripe located in the sequence of stripes of the burst. In the example, (s) comprises the time between the edges of consecutive stripes of the burst, comprising the estimated distance between two consecutive peaks (PosPeakInt) of step 115, or as determined in step 150.

The metric (d) comprises the time representing distance traversed between an edge of a stripe located in a sequence of stripes of a first burst of the pattern and a same edge of a stripe having the same location in a sequence of stripes of an alternate burst of the pattern. In the example, (d) comprises the time between the same edge of the first stripe of an A burst and the first stripe of a C burst, comprising the estimated distance between the initial peak of each burst having the same polarity (PosPeakIndexVec).

If the magnetic tape were moving in the reverse direction, the metric (d) is the time between the same edge of the last stripe of a C burst and the last stripe of an A burst.

The specific stripes are selected in view of the fact that other of the stripes may be shifted longitudinally to encode data in the servo pattern, as is known to those of skill in the art.

In one embodiment, once the metrics (d) and (s) are determined using peaks of one polarity, a verification is conducted using the opposite polarity peaks.

Thus, in the example, the process is repeated using the negative peaks, beginning at step 102. The negative peak branch beginning with step 107 is similar to the positive peak branch.

Input samples ($r_k$) of the servo signals are received in step 102, for example, comprising digital representations of the signal amplitude detected by a servo head and decoded by a signal decoder as discussed above.

In one embodiment of the negative peak branch, the edge of a stripe is determined by first detecting a zero crossing, comprising a zero crossing from positive to negative in step 107. In order to maintain stripe edge to stripe edge measurements of the same edge, the zero crossings utilized must be the same for all measurements. If no negative zero crossing is detected in step 107, the process returns to step 102 to detect the next input sample ($r_k$). A negative zero crossing of step 107, for example, is defined as when a new input sample ($r_k$) is negative and the previous sample ($r_{k-1}$) was positive. Step 107 raises a positive to negative zero crossing (Pos2NegZC) flag if a negative zero crossing is detected, and the search for a negative peak is initiated. If no negative peak is detected with respect to an input sample, step 112 returns to step 102 to detect the next input sample ($r_k$). In step 112, if an input sample ($r_k$) crosses a negative threshold, a negative peak is indicated.

The negative peak detection of step 112 results in several actions taken in step 117. A negative peak index is incremented by one and is employed to determine the stripe sequence and identify a valid [4 4 5 5] or [5 5 4 4] sequence. A negative peak time vector (NegPeakTimeVec) collects the arrival times of the negative peaks and is updated with the current peak arrival time, and is employed to detect the various metrics, including (d) and (s) discussed above. The estimated distance between two consecutive peaks (NegPeakInt) is updated if the distance between the current and the previous peak is smaller than the prior value. This distance may comprise (s). The zero crossing flag, (Pos2NegZC) flag, is reset to initiate a new search for a zero crossing.

In step 122, the distance between the current and previous peak (NegPeakDist) is detected from the negative peak time vector and is compared with the estimated peak distance within a burst. If this distance is by a factor of x (for example, x=1.5) larger than the peak distance within a servo burst, the start of a new servo burst has been detected (NegNewBurst). If a new burst is not detected in step 122, the detected peak is from an interior stripe and cannot begin the burst sequence, so the process returns to detect the next input sample ($r_k$). If a new burst is detected in step 122, the succeeding peaks will also be detected in succeeding steps 122 and employed to discern whether the negative peak index is detecting a 4 or 5 stripe burst in step 127.

In step 127, if the number of counted peaks in the current servo burst (NegPeakIndex) is a valid number (4 or 5), comprising a valid servo pattern, step 132 updates the time vector information with the peak arrival time, towards determining the (s) and (d) times. In step 132, the vector containing the number of peaks per servo burst (NegPeakIndexVec) is updated and the peak counter (NegPeakIndex) of step 117 is reset to zero. If, after a burst has been detected and a new burst is detected, and the number of counted peaks in the previous burst is not a valid number, step 137 resets the estimated distance between two consecutive peaks (NegPeakInt) to allow for a new acquisition attempt.

If step 142 indicates that a complete pattern of [4 4 5 5] or [5 5 4 4] bursts has not been completed, the process returns to obtain the next input sample ($r_k$) in step 102.

If step 142 indicates that a complete pattern has been detected (NegPeakIndexVec), estimates of (d) and (s) are computed from the peak arrival times stored in the vector NegPeakTimeVec, for example as multiples of a clock interval in step 150, and a metric ratio (d)/(s) is determined. The metric ratio (d)/(s) is independent of both the tape velocity and the lateral position.

The metric (s) comprises the time representing the distance traversed between an edge of a stripe located in a sequence of stripes of a burst and a same edge of another stripe located in the sequence of stripes of the burst. In the example, (s) comprises the time between the edges of consecutive stripes of the burst, comprising the estimated distance between two consecutive peaks (NegPeakInt) of step 117, or as determined in step 150.

The metric (d) comprises the time representing distance traversed between an edge of a stripe located in a sequence of stripes of a first burst of the pattern and a same edge of a stripe having the same location in a sequence of stripes of an alternate burst of the pattern. In the example, (d) comprises the time between the same edge of the first stripe of an A burst and the first stripe of a C burst, comprising the estimated distance between the initial peak of each burst having the same polarity (NegPeakIndexVec).

If the magnetic tape were moving in the reverse direction, the metric (d) is the time between the same edge of the last stripe of a C burst and the last stripe of an A burst.

Step 155 employs the ratio of the determined times from step 150, and compares the ratio to a threshold, wherein the threshold comprises a differentiation between different servo pattern types. In the example, the first pattern of FIG. 5 has a nominal ratio (d)/(s) of 20, whereas the second pattern of FIG. 6 has a nominal ratio (d)/(s) of 25.33. The threshold of step 155 employs a threshold in the vicinity of a midpoint between the nominal ratios, for example, of 22.67. Thus, if the ratio determined in step 150 is less than the threshold, the pattern indicated in step 160 is the first servo pattern; and if the ratio determined in step 150 exceeds the threshold, the pattern indicated in step 163 is the second servo pattern.

If metric estimates (d) and (s) are obtained from positive and negative peaks independently, those metric estimates can be combined in an appropriate manner to improve the quality of the combined estimates of the metrics (d) and (s).

Once the type of servo pattern has been established, the remaining required parameters for operation of the magnetic tape drive are computed. Examples comprise the tape velocity and the head lateral position.

In an alternative embodiment, the selected branch (positive peak branch or negative peak branch) is completed and the type of servo pattern determined in steps 155, 160 and 163, and subsequently, the opposite branch is conducted.

Figure 8A:
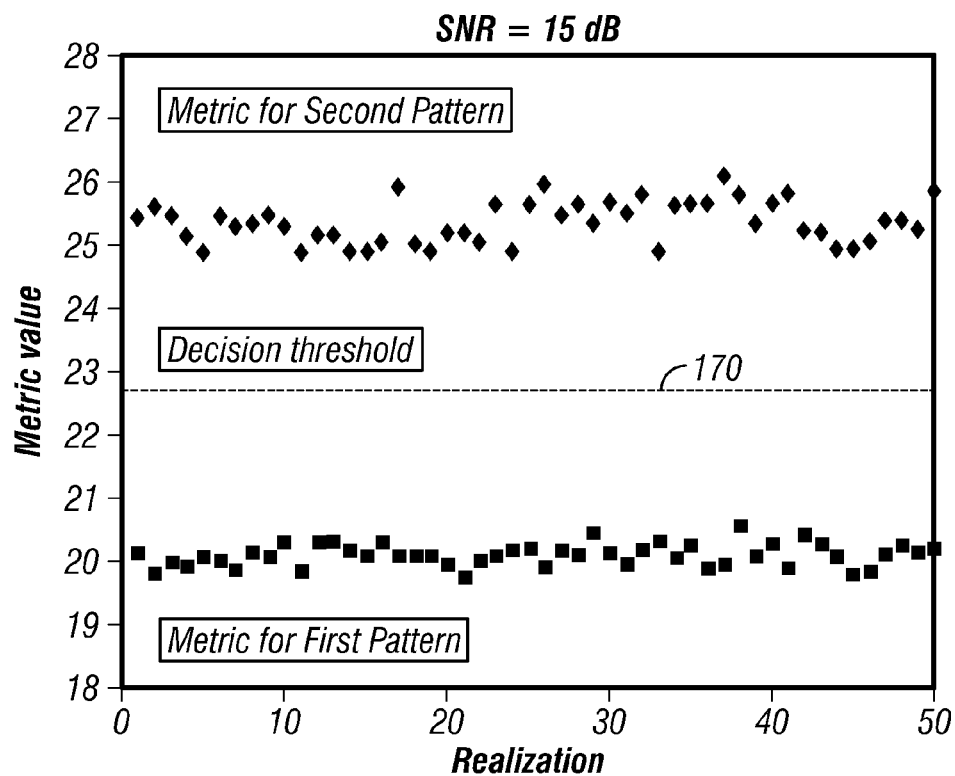
FIGS. 8A and 8B are charts depicting measured metrics of the method of FIG. 7 under different signal to noise ratios.
Figure 8B:
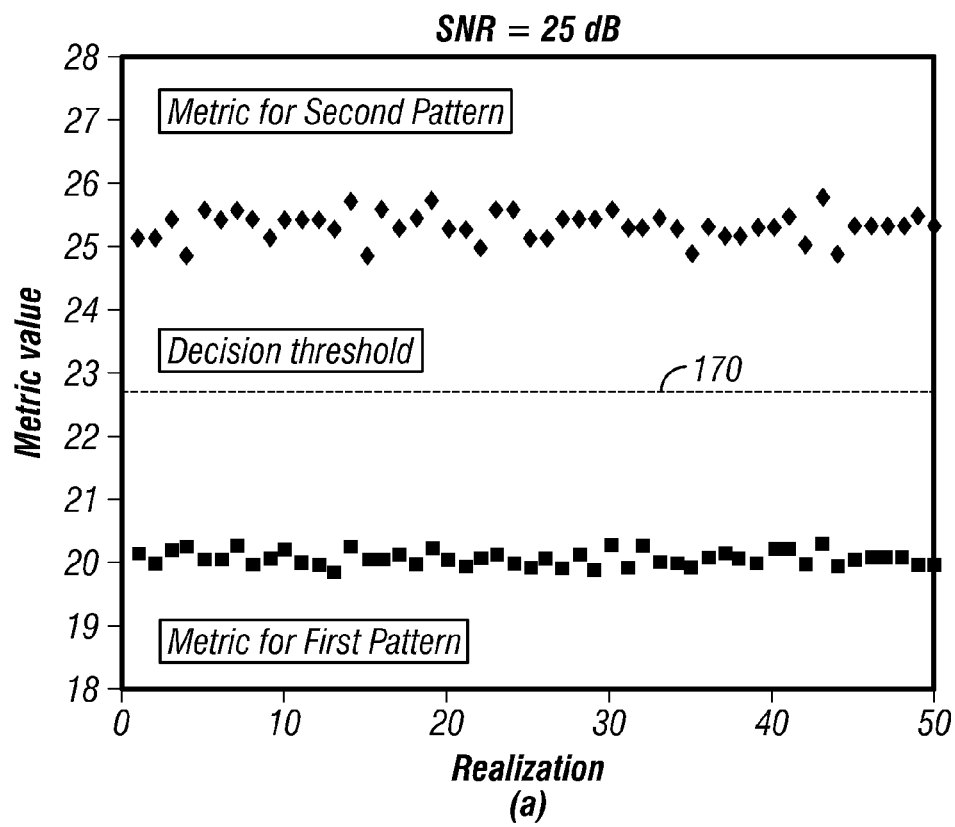

FIGS. 8A and 8B depict the results of the computation of the metric ratio (d)/(s) for the first and second servo patterns of, respectively, FIG. 5 and FIG. 6 under different signal to noise conditions. FIG. 8A represents the respective computed ratios taken in a signal to noise environment of 15 dB, and FIG. 8B represents the respective computed ratios taken in a signal to noise environment of 25 dB, both with the same decision threshold 170.

Figure 9:
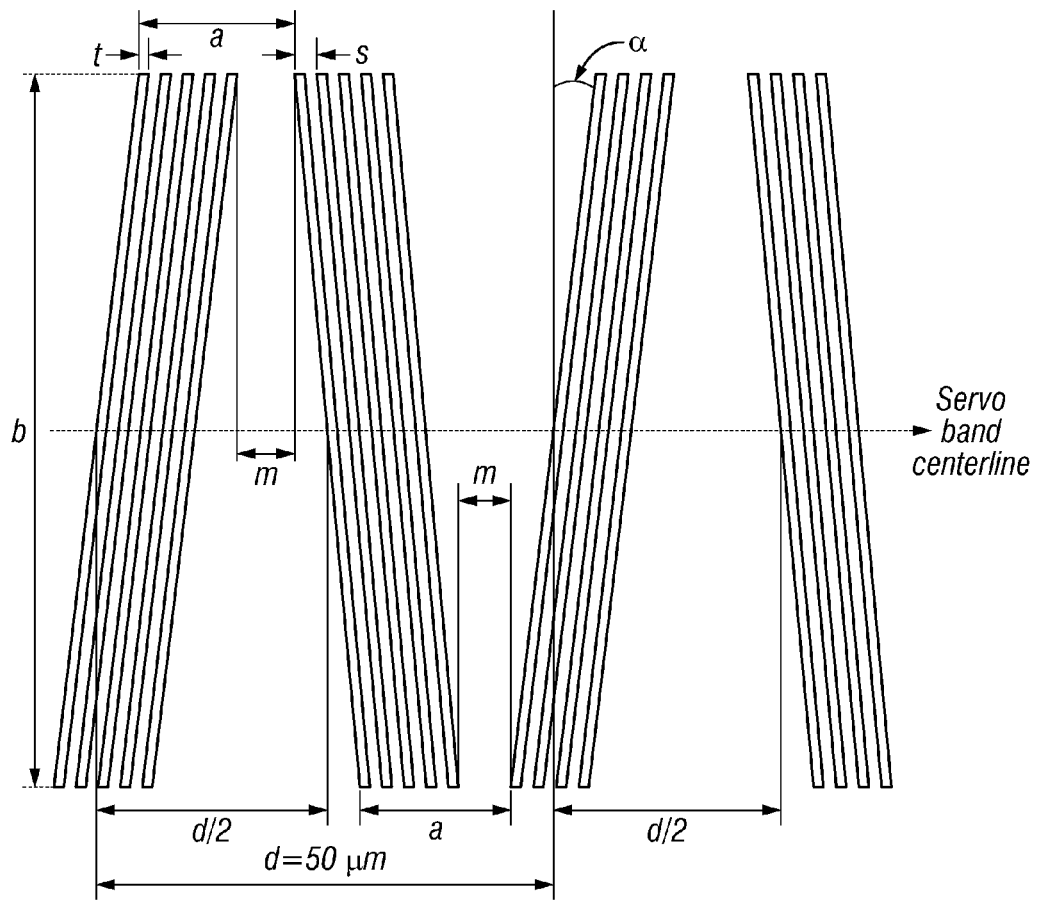
FIG. 9 is a diagrammatic view of a third servo pattern.

Referring to FIG. 9, the same method is applicable to differentiate between any servo formats, provided that the candidate servo formats are characterized by different values of the ratio (d)/(s). FIG. 9 represents any such servo pattern, and one example of a servo pattern is illustrated by the characteristics listed below the pattern. The nominal ratio (d)/(s) with respect to the example would comprise 16.67 and a suitable threshold with respect to the second servo pattern would comprise 21.

The implementations may involve software, firmware, micro-code, hardware and/or any combination thereof. The implementation may take the form of code or logic implemented in control 20 by a medium, such as memory, storage and/or circuitry where the medium may comprise hardware logic (e.g. an integrated circuit chip, Programmable Gate Array [PGA], Application Specific Integrated Circuit [ASIC], or other circuit, logic or device), or a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk—read only memory [CD-ROM], compact disk—read/write [CD-R/W] and DVD).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for distinguishing between different servo pattern types in a magnetic tape data storage drive having a servo read system comprising at least one read head, said system configured to read servo pattern information as a magnetic tape is moved longitudinally with respect to said at least one read head, said servo pattern comprising a timing-based servo pattern comprising an even number of bursts, each having a plurality of sloped magnetic stripes, adjacent bursts oppositely sloped, alternate bursts identically sloped, the method comprising:
   determining time between detection from said read head of a same stripe of alternate bursts of a pattern;
   determining time between detection from said read head of consecutive stripes of a burst of a pattern; and
   determining a ratio of said determined times.

2. The method of claim 1, additionally comprising the step of comparing said ratio to a threshold, said threshold comprising a differentiation between different servo pattern types.

3. The method of claim 2, wherein said detection of said times between said stripes comprises detection of time between signals representing said stripes, each subsequent to detection of a zero crossing in a polarity direction of said stripe signal.

4. The method of claim 3, wherein said detection of said stripe comprises detection of a peak of said stripe signal in said polarity direction of said zero crossing.

5. The method of claim 4, wherein said determined times comprise times between said peaks having a same polarity direction.

6. The method of claim 3, wherein said steps of determining said times comprise respectively, determining time (d) representing distance traversed between an edge of a stripe located in a sequence of stripes of a first said burst of said pattern and a same edge of a stripe having the same location in a sequence of stripes of an alternate burst of said pattern, and determining time (s) representing distance traversed between an edge of a stripe located in a sequence of stripes of a burst and a same edge of another stripe located in said sequence of stripes of said burst; said ratio comprises a ratio of (d) to (s).

7. The method of claim 6, wherein said step of determining said (s) time comprises determining said time between said edges of adjacent said stripes of said burst, measured as consecutive peaks of a same polarity.

8. A servo control system comprising:
at least one read head configured to read servo pattern information from a magnetic tape as said magnetic tape is moved longitudinally with respect to said at least one read head, said servo pattern comprising a timing-based servo pattern comprising an even number of bursts, each having a plurality of sloped magnetic stripes, adjacent bursts oppositely sloped, alternate bursts identically sloped; and
a servo control configured to detect said read servo pattern information and to determine time between detection from said read head of a same stripe of alternate bursts of a pattern; to determine time between detection from said read head of consecutive stripes of a burst of a pattern; and to determine a ratio of said determined times.

9. The servo control system of claim 8, wherein said servo control is additionally configured to compare said ratio to a threshold; and wherein said threshold comprises a differentiation between different servo pattern types.

10. The servo control system of claim 9, wherein said servo control detection of said times between said stripes comprises detection of time between signals representing said stripes, each subsequent to detection of a zero crossing in a polarity direction of said stripe signal.

11. The servo control system of claim 10, wherein said servo control detection of said stripe comprises detection of a peak of said stripe signal in said polarity direction of said zero crossing.

12. The servo control system of claim 11, wherein said servo control determined times comprise times between said peaks having a same polarity direction.

13. The servo control system of claim 10, wherein said servo control is configured to, in determining said times, respectively, to determine time (d) representing distance traversed between an edge of a stripe located in a sequence of stripes of a first said burst of said pattern and a same edge of a stripe having the same location in a sequence of stripes of an alternate burst of said pattern, and to determine time (s) representing distance traversed between an edge of a stripe located in a sequence of stripes of a burst and a same edge of another stripe located in said sequence of stripes of said burst; wherein said ratio comprises a ratio of (d) to (s).

14. The servo control system of claim 13, wherein said servo control is configured to determine said (s) time comprising determining said time between said edges of adjacent said stripes of said burst, measured as consecutive peaks of a same polarity.

15. A magnetic tape data storage drive comprising:
a drive system to move a magnetic tape longitudinally;
at least one read head configured to read servo pattern information from a magnetic tape as said magnetic tape is moved by said drive system longitudinally with respect to said at least one read head, said servo pattern comprising a timing-based servo pattern comprising an even number of bursts, each having a plurality of sloped magnetic stripes, adjacent bursts oppositely sloped, alternate bursts identically sloped;
an actuator system configured to move said at least one read head laterally with respect to said magnetic tape; and
a servo control configured to operate said actuator system; and configured to detect said read servo pattern information and to determine time between detection from said read head of a same stripe of alternate bursts of a pattern; to determine time between detection from said read head of consecutive stripes of a burst of a pattern; to determine a ratio of said determined times; and to compare said ratio to a threshold, wherein said threshold comprises a differentiation between different servo pattern types.

16. The magnetic tape data storage drive of claim 15, wherein said servo control detection of said times between said stripes comprises detection of time between signals representing said stripes, each subsequent to detection of a zero crossing in a polarity direction of said stripe signal.

17. The magnetic tape data storage drive of claim 16, wherein said servo control detection of said stripe comprises detection of a peak of said stripe signal in said polarity direction of said zero crossing.

18. The magnetic tape data storage drive of claim 17, wherein said servo control determined times comprise times between said peaks having a same polarity direction.

19. The magnetic tape data storage drive of claim 16, wherein said servo control is configured to, in determining said times, respectively, to determine time (d) representing distance traversed between an edge of a stripe located in a sequence of stripes of a first said burst of said pattern and a same edge of a stripe having the same location in a sequence of stripes of an alternate burst of said pattern, and to determine time (s) representing distance traversed between an edge of a stripe located in a sequence of stripes of a burst and a same edge of another stripe located in said sequence of stripes of said burst; wherein said ratio comprises a ratio of (d) to (s).

20. The magnetic tape data storage drive of claim 19, wherein said servo control is configured to determine said (s) time comprising determining said time between said edges of adjacent said stripes of said burst, measured as consecutive peaks of a same polarity.

* * * * *